April 21, 1970          H. D. JOHNSON          3,507,309
SPRAYER FOR HYDROCARBON-CONTAINING LIQUIDS
Filed July 7, 1967          2 Sheets-Sheet 1
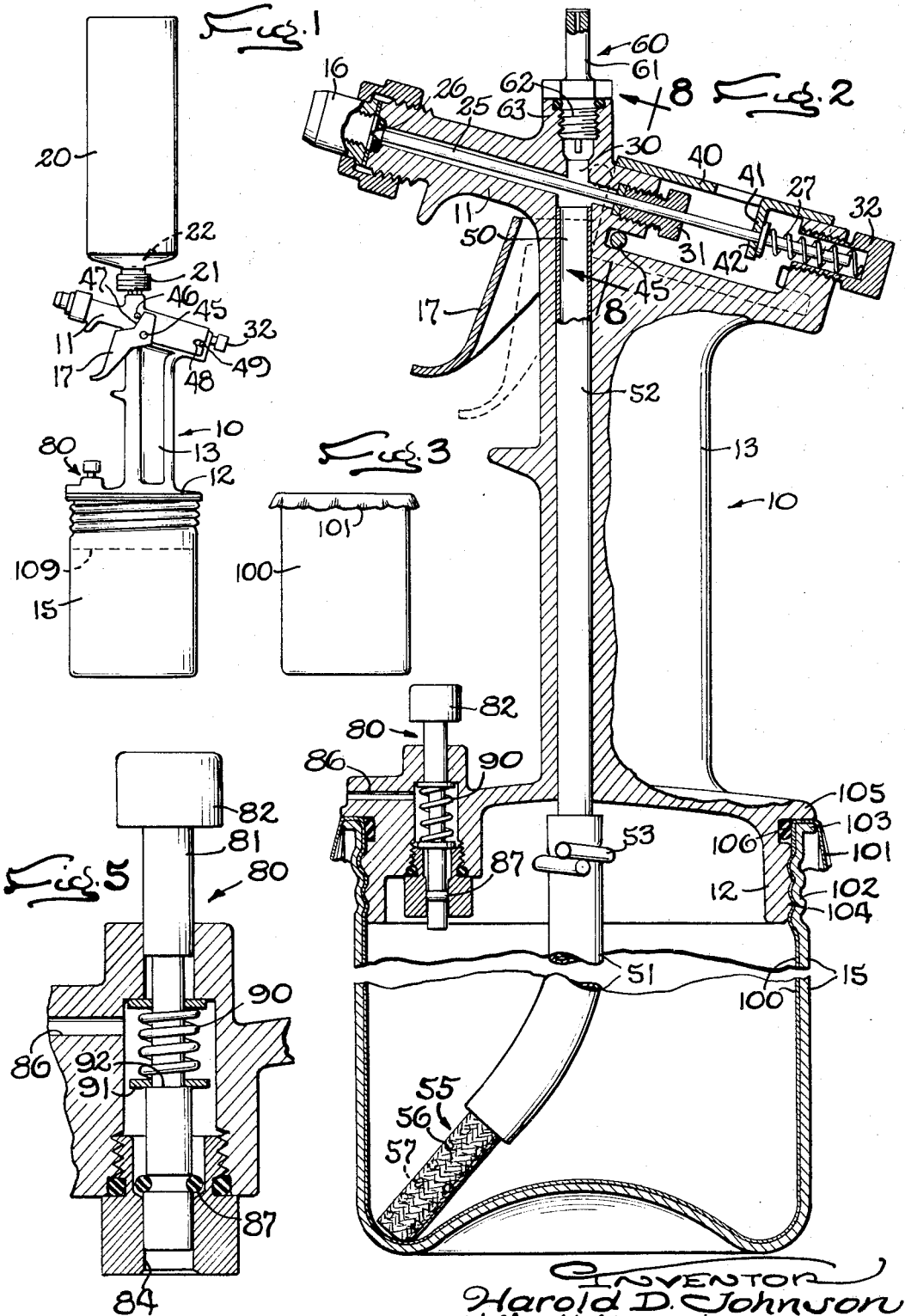
INVENTOR
Harold D. Johnson
by: Wolfe, Hubbard, Voit & Osann
ATTORNEYS

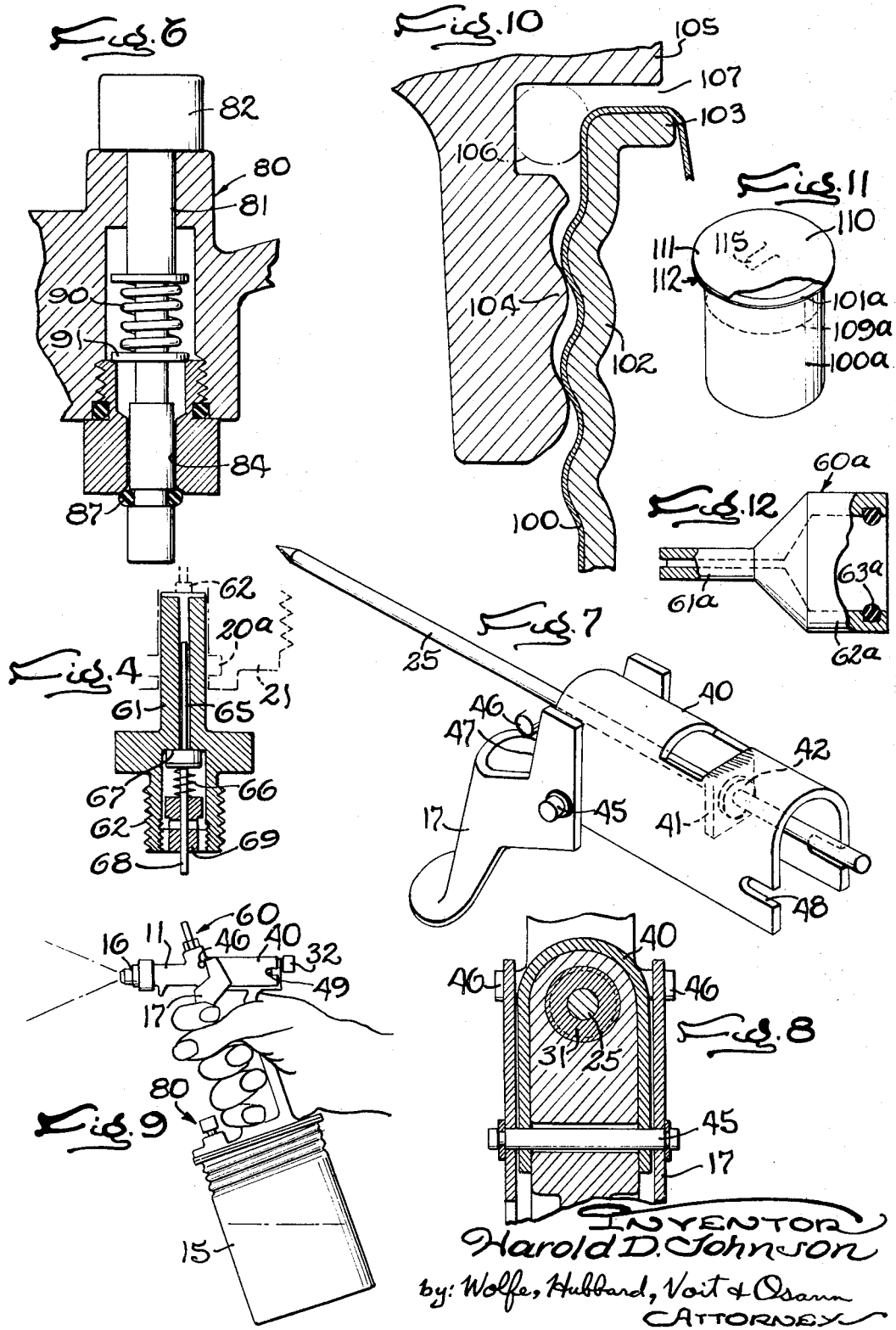

United States Patent Office 3,507,309
Patented Apr. 21, 1970

3,507,309
SPRAYER FOR HYDROCARBON-CONTAINING LIQUIDS
Harold D. Johnson, 127 Nichols Drive,
Sycamore, Ill. 60178
Filed July 7, 1967, Ser. No. 651,829
Int. Cl. B65b 1/04, 3/04, 31/00
U.S. Cl. 141—18                    10 Claims

ABSTRACT OF THE DISCLOSURE

A sprayer for oil-based liquids in which the liquid in the spray tank is charged by temporary coupling of the sprayer with a bottle of propane and with means for manual and automatic venting.

---

It is an object of the present invention to provide a sprayer for paint or the like which is easily portable, of inherent light weight, convenient to use being unencumbered with a pressure hose, and which does not require a compressor.

It is another object to provide a sprayer which is easily and quickly pressurized by a shot of liquid from a bottle of propane and in which means are provided for determining the proper amount of propane. Consequently, it is an object to provide a sprayer which is not only economical in its use of pressurizing gas but which can be safely charged by a novice with little or no instruction. It is, moreover, an object to provide a sprayer which is self-cleaning and which is so constructed that the addition of pressurizing gas clears out the nozzle chamber, dip tube and strainer so that clogging and erratic operation, so often experienced in conventional sprayers, particularly when using paint which is contaminated by skin or sedimentation, is effectively avoided. In addition it is an object to provide a sprayer which employs a sustained high pressure and which, because of the solvent aerosol action of the gas, is capable of handling the heaviest house paints or most viscous asphaltic coatings with perfect ease and without the necessity or expense of mixing in thinners. Indeed, the dissolved gas upon striking the atmosphere expands the paint globules, independently of viscosity considerations, into a fine, easily directed mist. As a result the sprayer is usable by professionals for difficult production work, yet simple enough for use by a householder for all spraying tasks.

It is still another object to provide a sprayer which is inherently simple and inexpensive, capable of use for a wide variety of work, which is easily cleaned and which requires no other maintenance. It is an object to provide a sprayer which is easily charged, comfortable to hold, easily manipulated, and which can be used for long periods without tiring.

It is yet another object to provide a sprayer of the batch loaded type which may be kept loaded and used only intermittently or occasionally as with a conventional "aersol" spray can, but at a sharply reduced cost, making it practical for a shop to maintain a complete battery of sprayers which are kept loaded, for immediate use, with various colors or types of paint.

In one of its aspects it is an object to provide a sprayer which is ideally suited for the spraying of a thixotropic mix, such as light-reflecting glass beads in a suitable binder, and which is capable of storing the mix in a spray tank without the usual settling-out problems.

Other objects and advantages of the invention will become apparent upon reading the attached detailed description and upon reference to the drawings in which:

FIGURE 1 is a side view of a sprayer constructed in accordance with the present invention showing the charging from a bottle of propane;

FIG. 2 is a vertical section taken through the sprayer of FIG. 1;

FIG. 3 is a bag for use in the sprayer of FIG. 1;

FIG. 4 is a fragmentary section taken through the charging nipple;

FIG. 5 is an enlarged fragmentary section showing the relief valve in its automatic venting position;

FIG. 6 is a fragmentary section taken at right angles to FIG. 5 and showing the valve in the manual venting position;

FIG. 7 is a fragmentary perspective showing the control valve linkage;

FIG. 8 is a fragmentary transverse section taken along the line 8—8 in FIG. 2;

FIG. 9 shows the sprayer in hand-held operation;

FIG. 10 is a fragmentary enlarged section taken through the threaded lip portion of the tank under pressure-relieving conditions;

FIG. 11 shows a modified and preferred form of bag for pre-loaded paint;

FIG. 12 shows an alternate form of nipple dimensioned to fit the discharge nozzle of the sprayer.

Turing now to the drawings there is shown a sprayer having a frame 10 intended for spraying of oil-based paint or the like in the form of a casting having a transverse portion 11 at its upper end, a threaded flange portion 12 at its lower end joined by a central, or handle, portion 13 of reduced cross section. Screwed to the flange portion 12 is a tank 15 for containing the paint. At one end of the transverse portion 11 is a nozzle 16 through which the paint is controllably released by a trigger 17.

As will be discussed, the sprayer is intended to be pressurized by a bottle of propane or equivalent liquified gas indicated at 20 having a neck 21 and the usual check valve (not shown) 22. At normal room temperature the liquified gas in the bottle 20 exerts a pressure on the order of 120 pounds per square inch.

Extending through the transverse portion 11 of the frame is a valve plunger 25 having a conical tip which is pressed against a valve seat 26 by means of a spring 27. The space which surrounds the valve plunger and which communicates with the nozzle may be conveniently referred to as the nozzle chamber 30, the chamber being sealed by a packing nut 31 which surrounds the plunger. The permissable rearward movement of the valve plunger, which determines the flow released at the nozzle 16, is determined by an adjusting nut 32 at the rear end of the plunger, the plunger bottoming within the nut.

For the purpose of coupling the trigger 17 to the valve plunger, yoke 40 is provided which is slidable with respect to the transverse portion of the frame and which is of arched or tunnel shape. The yoke has a struck-out tab 41 which is bent downwardly to engage an abutment 42 which is fixed to the rear end of the plunger and which, moreover, serves as a forward seat for the spring 27. The trigger and the yoke are pivoted together by a transverse pivot 45. A pin-shaped abutment 46 mounted on the frame, and which may be integral therewith, engages a reaction surface 47 at the upper end of the trigger. The rear end of the yoke is slotted as indicated at 48 to engage a pin 49 which serves to retain the yoke and to guide it in its endwise movement.

In operation, then, with the handle 13 gripped by the hand of the user, pressure applied to the trigger 17, reacting against the abutment 46 at the upper end of the trigger, causes movement of the pivot 45 thrusting the yoke 40 rearwardly. This draws the valve plunger 25 rearwardly to open the valve seat 26, the degree of opening being dependent upon the movement of the plunger, against the biasing force of the spring 27, prior to bottoming within the adjusting nut 32.

In accordance with the present invention a downwardly extending passageway is formed in the frame communicating with the nozzle chamber and terminating in a dip tube which extends substantially to the bottom of the tank and with a nipple being provided on the frame dimensioned for temporary connection with the neck of a bottle of propane gas so that a shot of the liquified gas may be admitted through the dip tube into the tank for intimate mixing with the paint or the like contained therein, the nipple preferably being in communication with the nozzle chamber. Thus, as shown particularly in FIG. 2, the frame of the sprayer includes a vertical passage 50 which extends between the nozzle chamber 30 at its upper end and a dip tube 51 at its lower end. Conveniently, the passage 50 may be lined with an inserted tube 52 which projects sufficiently at its lower end to permit connection of the dip tube, the latter being held securely thereon by a spring clip 53. A strainer 55 at the lower end of the dip tube is formed of a braided fabric tube 56 which is kept extended by a spring 57 within it, with the end of the tube being tucked inside of the end of the spring.

For the purpose of admitting liquified gas to the nozzle chamber 30, a nipple 60 is provided having a shank 61 and a thread 62 which is screwed into a threaded boss 63 integrally provided at the top of the transverse portion of the frame. As shown in FIG. 4, the nipple includes a check valve made up of a check valve plunger 65 having a spring 66 which presses the plunger against a check valve seat 67. The plunger has a tail portion 68 which guidingly extends through an opening in a threaded bushing 69 which is screwed into the lower end of the nipple and against which the check valve spring 66 is seated. The nipple, as shown, is dimensioned for a slideable fit within the neck 21 of the bottle, being sealed with respect thereto by an already-contained O-ring 20a. The nipple is sufficiently long as to actuate the plunger 62 of the check valve 22 already provided in the bottle, and if desired the tip of the nipple may be slotted as indicated at 63 to insure passage of the liquified gas notwithstanding the engagement of the plunger 62 with the tip of the nipple. It is one of the features of the present invention that the nipple 60 is axially oriented, extending upwardly generally along the center line of the sprayer frame and well within the confines of the flat base 18 of the tank 15. Consequently with the sprayer seated on a flat supporting surface it is a simple matter to press the inverted bottle 20 onto the nipple and to hold it there, in spite of the internal pressure, until an adequate amount of the liquified propane has been fed into the sprayer.

In accordance with one of the important features of the invention a relief valve is provided at the top of the tank for venting the tank upon reaching a predetermined pressure which is less than the nominal pressure of the liquified propane, the relief valve being calibrated to release when a pressure has built up indicating an optimum of propane and paint, short of the amount of propane which would correspond to complete saturation. Thus, as shown in the drawings, and particularly in FIGS. 2, 5, and 6, the relief valve indicated at 80 includes a relief valve plunger 81 having a knob 82 and slideably mounted in alined bores 83, 84 at the top and bottom of a relief valve chamber 85 communicating with a vent 86. The plunger normally occupies the central position shown in FIG. 2 in which an O-ring 87 on the valve plunger seals the lower bore 84 which communicates with the interior of the tank. The plunger is held in such position by a spring 90 which surrounds the plunger and which seats upon a washer 91 which is positioned by a shoulder 92 on the plunger. The shoulder is so located that the O-ring 87 on the plunger normally occupies a position about midway along the bore 84. As the pressure within the tank rises, the plunger is forced upwardly against the biasing force of the spring 90 until the point of release shown in FIG. 5 is reached whereupon the gas is vented through the vent 86 and no further buildup is possible. Not only is the upper limit of pressure thus controlled, but the movement of the valve plunger 81 and the sound of escaping gas provides ample signal to the user that the desired pressure has been reached and that the bottle of propane may be removed. This permits reseating of the check valve in the nipple 60 so that the sprayer is effectively sealed with its charge of pressurizing gas. Where it is desired to vent the tank prior to removal, application of downward pressure to the relief valve plunger, as shown in FIG. 6, causes the O-ring 87 to "clear" the lower end of the bore 84 to provide an escape passage.

In carrying out the present invention, the tank 15 is preferably of straight-sided construction, having a fitted bag or liner 100, having a flange 101 at its mouth which is interposed between the tank and the flange portion 12 of the frame as the two are engaged. At the upper end of the tank a rolled thread 102 is provided which terminates in a lip 103. A corresponding thread 104 on the flange portion 12 of the frame has an adjacent shoulder 105 which serves as a stop for the lip 103. Arranged adjacent the shoulder 105 is a recessed O-ring 106. The threads 102, 104 are of shallow, rounded configuration and the bag 100 is preferably of yieldable plastic so that in the event of the development of any excessive pressure in the tank 15, as might possibly be occasioned by a sticking of the vent valve at a time when the sprayer is subjected to a high ambient temperature condition, relative endwise movement of the threads occurs as shown in FIG. 10 to open a gap 107 thereby to permit blow-out of the O-ring 106 through the gap to relieve the pressure.

In typical usage, a bag 100 may be installed in the tank 15 with the flange at the mouth of the bag being turned downwardly as shown in FIG. 3. The tank may then be filled with paint up to approximately the level 109, which may, correspond to 80% occupancy to provide for addition of the liquified propane. The tank 15 is then screwed into place. With the tank seated on a supporting surface, the bottle 20 is inverted over the sprayer on the nipple 60, unseating the check valve within the neck of the bottle, so that liquified propane flows into the nozzle chamber 30, downwardly through the passage 50 and dip tube 51 to a point below the level of the paint. Assuming use of an oil based paint, with which the propane is freely miscible, the propane becomes dissolved in the body of the paint. The first propane to be received in the tank is in the vapor form, but with the lowering of the temperature within the tank and with increasing pressure, the added propane is in the liquid phase. The space above the level of the liquid in the tank will, however, include propane in the vapor phase, with the pressure thereof increasing to a point, which is preferably on the order of 90 pounds (below the 120 pound nominal pressure of the propane at room temperature), at which the plunger 81 of the relief valve is upwardly unseated as shown at FIG. 5. The sound of the escaping gas alerts the user to remove the bottle 20 from the sprayer to complete the filling operation. If desired, in order to facilitate mixing of the liquified propane and the paint, the sprayer, with the inverted bottle, may be rocked from side to side to provide a degree of agitation of the paint. It is found that with propane added to a point which is less than complete saturation an optimum paint-propane mix is provided while avoiding any unnecessary usage, or waste, of the propane. In practice it is found that one bottle of propane of standard size is capable of pressurizing 4 one-quart charges of paint which amounts to about 12 to 25 cents per charge.

It is found that the miscibility of the propane and paint makes it possible to spray paint having a higher viscosity than can be easily accommodated by more conventional sprayers without resorting to use of thinner. Thus, for example, the tank may be charged with heavy house paint which is automatically thinned upon mixing with the propane and which remains in easy flowing condition during passage up through the dip tube, through the nozzle chamber, and out of the valve seat 26 at the nozzle 16. Upon sudden release of the pressure to atmospheric, the globules of paint at the nozzle are immediately reduced, by the aerosol action of the propane, to particles of much smaller size provide a fine spray easily directed to the receiving surface. Indeed, one skilled in the art will immediately appreciate that the present sprayer is not limited to used with conventional paints, but may be employed to spray any viscous liquid which is miscible with the pressurizing gas. When the propane escapes the paint or other material is, of course, reduced to its original state of viscosity, thus preventing any sagging or curtaining of the material on a vertical surface.

Since a portion of the propane remains in the liquid phase during the time that the paint in the tank is being gradually consumed, the discharge pressure remains constant until the very end. After the paint has been exhausted, the residual gas in the tank may be vented simply by pressing down upon the knob 82 on the relief valve plunger 81 permitting escape as shown in FIG. 6.

Thereafter the tank may be unscrewed and refilled with an additional charge of paint. With the tank in place, the propane bottle 20 may be placed in loading position upon the nipple and the sprayer pressurized, as before, until venting at the relief valve is noted. It is found that the liquid propane, added through the nozzle chamber, performs a solvent flushing or cleansing action. Any solid particles in the nozzle chamber or dip tube are forceably flushed either into, or through, the strainer 55. Even more importantly, the pores of the strainer are reverse-flushed to unseat and remove any solid particles, from either skin or sedimentation, which may have accumulated on the strainer during the preceding spraying cycle. Moreover if any tendency to erratic operation is noted during use of the sprayer, indicating contamination of the system by solid particles, the sprayer may be given an additional brief flush with the propane bottle 20. The trigger may be pressed during this flushing operation in order to forceably clear the seat 26 of the release valve and any fine openings in the sprayer nozzle depending upon the particular design of nozzle which is used. Any excess propane which may be added to clear the sprayer, simply exceeds the set pressure of the relief valve so that the excess is vented off.

The flushing or cleansing capability of the propane may be utilized where it is desired to keep the sprayer idle for some period of time prior to its next usage. Thus, with the tank still partially filled with paint, the sprayer may be given a cleansing shot of propane to clear, and remove paint from, the nozzle, nozzle chamber and dip tube. The sprayer may then be idled without risk that the paint will dry or harden in the dip tube and nozzle system. This capability is particularly valuable where a sprayer is put to intermittent use and where it is desired to avoid the special and difficult cleaning which conventional sprayers require after each operation. Indeed, a shop may employ a battery of sprayers of the present design kept charged with different types or colors of paint ready for immediate usage. The advantages of a conventional aerosol spray can are thus achieved but without the high per unit of paint dispensed from such cans.

As further evidence of the capability of the present system it may be noted that sprayers of the present design may be successfully employed in the spraying of thixotropic mixes in which solid particles, for example glass beads required for reflective purposes, may be successfully used. As the liquid propane is added, it tends to reduce the viscosity of the binder in the mix, separating the particles by combined percolating and solvent action. In the spraying of such materials a resilient seat may be employed in place of the usual metallic seat 26 to insure re-setting of the valve plunger. Where it is desired to interrupt spraying of a thixotropic mix, the relief valve 80 may be manually operated, venting the propane so that the binder is restored to its viscous state which tends to inhibit the settling of particles. Just before use, an additional shot of propane restores the mix to the desired consistency and even dispersion required for spraying.

It is one of the features of the present invention that the present sprayer is ideally suited for use with pre-packaged paint. As shown in FIG. 11, the bag indicated at 100a having a flange 101a is provided with a cover panel 110 which may be formed of the same plastic as the bag itself. The periphery 111 of the cover panel is bonded to the mouth of the bag, preferably by thermal means, to form a composite flange 112 of double thickness which may, if desired, be interposed between the thread on the tank and the thread on the flange portion of the sprayer frame. The support provided by interposing the flange between the threads is particularly desirable where the bag is made of plastic film. However I contemplate that the side wall of the bag may be made of sufficiently thick or sufficiently rigid plastic material as to be self-supporting, in which case the flange may be narrower or even omitted. The bag is filled only to the level 109a to accommodate the added propane. If desired, the cover of the bag may be intentionally weakened to form an integral tab 115 which may be lifted to accommodate entry of the dip tube. Alternatively, the center of the cover may be pierced with a suitable tool. The plastic material may be of any suitable type not soluble in hydrocarbon solvents.

It will be apparent that in use of a preloaded bag, the bag is simply slipped into place in the tank, an opening is provided for the dip tube and the tank is then screwed into place. No pouring of paint is required and when the paint has been exhausted, the empty bag may be simply discarded and replaced by a fresh, loaded one.

While it is one of the features of the invention that the nipple 60 is permanently mounted as part of the sprayer structure, it will be apparent that some of the advantages of the invention may be obtained by use of a nipple fitting, or adapter, which is slipped into place on the nozzle 16. Such an adapter, shown at 60a in FIG. 12, includes a shank 61a dimensioned to fit into the neck of a propane bottle and a base 62a which may, for example, be fitted with an O-ring 63a, for slipping over the nozzle of the sprayer. The adapter is installed upon the nozzle and the propane bottle 20 is pressed into place to unseat its check valve 22. The resulting pressure causes the end of the valve plunger to be moved backwardly from its seat 26 and against the force of the biasing spring 27. Flow is continued until automatic venting of the relief valve 80, just as in the preferred form of the invention. Use of the fitting 60a has the advantage that the invention, and my teachings, may be utilized in connection with sprayers of more conventional design, with or without the automatic venting feature.

While the invention has been described in connection with the spraying of paint or the like, it will be appreciated by one skilled in the art that the invention is not limited thereto and may be applied to the pressurization and dispensing of other than coating substances, provided that the substances are miscible with the propane. Indeed, while the invention has particular application to use of the readily available propane bottles, it will be understood that in some of its aspects the invention is not limited to use of the particular substance propane, and other gases, capable of miscibility with the material being sprayed, may be employed. Thus, in the following claims, the term "propane" shall be understood to include within its scope equivalent liquified gases, preferably hydrocarbons, which exert reasonable pressure at normal ambient temperatures, pressures on the order of 20 to 150 pounds per square inch, and which are miscible with the liquid to be sprayed.

While use of a hydrocarbon gas might raise a question as to fire hazard, experience with the present sprayer has shown that propane may be employed safely indoors provided that there is at least that ventilation which would normally be used in a paint spraying operation.

The present sprayer, it is found, can be employed for long periods of time, and easily manipulated, without tiring. The reason for this is that the handle portion 13, which is of reduced cross section, is generally centered with respect to the center of gravity of the tank and its contents so that the sprayer tends normally to occupy a pendulous vertical position. This is to be contrasted with conventional sprayers which tend to cock downwardly during use. Moreover the user does not have to contend with the pressurizing hose or, indeed, the expense of the compressor usually required in a commercial spraying operation. It may be noted, also, that since the sprayer requires only a pressurizing shot of propane there is no necessity for keeping the propane bottle as part of the assembly during use. The sprayer may be swung through a substantial angle from side to side with simple wrist motion, due to the fact that the wrist is inherently close to the vertical axis of the sprayer. It will be apparent that the sprayer possesses features not to be found in sprayers which have been available for commercial or household use. Because of its wide range of usage and low cost, sprayers of the present design may be employed universally, with the capacity of the tank being varied depending upon the size of the job to be done.

The term "saturation" as used herein refers to the condition in which the tank will accept no more propane from the bottle. The term "oil-based paint or the like" used in the claims is intended to refer to a sprayable liquid having any appreciable hydrocarbon content making it miscible with the propane, even up to 100%. Thus, while the term "sprayer" is primarily intended to cover a sprayer for coating a receiving surface, it is not limited thereto and includes use in other environments where spray type discharge of an oil-based, and therefore combustible, liquid is required.

I claim as my invention:

1. A sprayer for oil-based paint or the like for use with a bottle of propane having a neck and check valve therein comprising a frame having a nozzle and a nozzle chamber at its upper end and a tank at its lower end, a manual release valve associated with the nozzle for controlling the flow therethrough, a dip tube connected to the nozzle chamber and extending to the bottom of the tank, a nipple having a check valve communicating with the nozzle chamber, said nipple being dimensioned to fit into the nck of a bottle of propane for unseating the check valve in the latter so that when the bottle is pressed into position on the nipple liquified propane flows into the nozzle chamber and down the dip tube to a point below the level of the paint in the tank for intimate mixing therewith, said relief valve including a plunger having a biasing spring and valve seat, with the plunger being mounted for progressive endwise movement against the biasing spring in response to the increase in pressure accompanying the progressive admission of liquified propane until venting occurs at the valve seat thereby to signify to the user that sufficient propane has been admitted to the tank.

2. A sprayer for oil-based paint or the like for use with a bottle of propane having a neck and check valve therein comprising a frame having a nozzle and a nozzle chamber at its upper end and a tank at its lower end, a normally closed manual release valve associated with the nozzle for controlling the flow therethrough, a dip tube connected to the nozzle chamber and extending substantially to the bottom of the tank and having a strainer at its lower end, a nipple having a check valve communicating with the nozzle chamber, said nipple being dimensioned to fit into the neck of a bottle of propane for unseating the check valve in the latter while the manual release valve remains in its normally closed condition so that when the bottle is pressed into position on the nipple liquified propane flows through the nozzle chamber and down the dip tube for reversed flushing of the strainer thereby to clean the nozzle chamber and dip tube by the solvent action of the liquified propane and to unseat any accumulation of solid particles on the strainer tending to obstruct free flow of the paint.

3. A sprayer for oil-based paint or the like for use with a bottle of propane having a neck and check valve therein comprising, in combination, a frame having a nozzle and a nozzle chamber at its upper end an a tank at its lower end, a manual release valve associated with the nozzle for controlling the flow therethrough, a dip tube coupled to the nozzle chamber and extending substantially to the bottom of the tank, a nipple having a check valve communicating with the nozzle chamber, said nipple being dimensioned to fit into the neck of the bottle of propane for unseating the check valve in the latter said tank having a flat base and said nipple being oriented substantially perpendicularly to the base and alined substantially with the central portion of the base so that the bottle may be kept seated on the nipple by application of pressure in line with the nipple and against the base, and means including a member at the top of the tank subject to the pressure within the tank and biased for movement progressively as the pressure increases for indicating to the operator that a predetermined pressure less than the pressure in the bottle has been achieved in the tank.

4. A sprayer for oil-based paint or the like for use with a bottle of propane having a neck and a check valve therein comprising, in combination, a frame having a nozzle and a nozzle chamber at its upper end and a tank at its lower end, a release valve associated with the nozzle for controlling the flow therethrough and having means for manual manipulation, a dip tube connected to the nozzle chamber and extending downwardly substantially to the bottom of the tank, a nipple communicating with the nozzle chamber, said nipple being dimensioned to fit into the neck of a bottle of propane for unseating the check valve in the latter, so that when the bottle is pressed into position on the nipple liquified propane flows through the nozzle chamber and down the dip tube for release at a point below the level of the paint in the tank, a relief valve at the top of the tank, said relief valve including a spring biased plunger with the spring rate and plunger diameter being such as to provide relief at a pressure below the maximum pressure which may exist in the bottle thereby to signify to the user that sufficient propane has been admitted to the tank, said relief valve including means for imparting movement manually to the plunger for intentional venting of the propane in the tank for accommodation of a fresh flushing charge of propane incident to interrupted usage of the sprayer.

5. A sprayer for oil-based paint or the like for use with a bottle of propane having a neck and a check valve therein, a frame having a nozzle and a nozzle chamber at its upper end, and having a thread for engaging a tank at its lower end, a release valve associated with the nozzle for controlling the flow therethrough and having means for manual manipulation, a dip tube connected to the nozzle chamber and extending substantially to the bottom of the tank, a nipple communicating with the nozzle chamber, said nipple being dimensioned to fit into the neck of a bottle of propane for unseating the check valve in the latter so that when the bottle is pressed into position on nipple liquified propane flows through the nozzle chamber and down the dip tube, a straight sided tank of cup shape having a threaded lip for engaging the thread on the frame, a shoulder on the frame for bottoming the lip of the tank and having an adjacent O-ring, a bag of flexible plastic material conforming to the interior of the tank and having a flange at its mouth interposed between the threads on the frame and tank, the threads being of shallow rounded configuration so that upon development of excess pressure in the tank limited axial slippage occurs between the tank and the frame thereby opening a gap at the shoulder for blowing out of the O-ring for relief of said pressure.

6. A sprayer for oil-based paint or the like for use with a bottle of propane having a neck and check valve therein comprising, in combination, a frame having a nozzle and a nozzle chamber at its upper end and a large diameter thread at its lower end for engaging a tank, a release valve associated with the nozzle for controlling the flow therethrough and having means for manual manipulation, a straight sided tank of cup shape having a threaded lip for engaging the thread on the frame, a dip tube connected to the nozzle chamber and extending substantially to the bottom of the tank, a bag of flexible plastic material conforming to the interior of the tank, a cover on said bag peripherally sealed to the mouth of the bag to form a flange which is received between the threads when the tank is crewed into place on the frame, said cover having provision for passing the dip tube, and means including a nipple dimensioned to fit into the neck of the bottle of propane for unseating the check valve in the latter for flow of liquified propane downwardly through the dip tube and into the bag.

7. For use with a sprayer for oil-based paint or the like having a frame including a nozzle and downwardly extending dip tube and having a tank in the form of a straight sided cup threaded to the bottom of the frame and having provision for admission of liquified gas through the dip tube, the combination comprising a bag of flexible plastic material conforming to the interior of the tank and having a circular lip, a cover on said bag peripherally sealed to the lip to define an outwardly extending flange of such thickness as to permit inclusion between the threads as the tank is screwed into place, said cover being normally sealed but having provision for admitting the dip tube, said bag having a charge of paint or the like filling only a portion of the volume thereof thereby to accommodate admission of liquified gas into the bag via the dip tube.

8. For use with a sprayer for oil-based paint or the like having a frame including a nozzle and downwardly extending dip tube and having a tank in the form of a straight sided cup threaded to the bottom of the frame and having provision for admission of liquified gas through the dip tube, the combination comprising a container of thin plastic material conforming to the interior of the tank and having a circular lip, a cover on said bag integral with the lip to define a sealed container, said cover being intentionally weakened for producing an opening at the center thereof for admitting the dip tube, the material of which the side wall of the container is made being sufficiently rigid as to be self-supporting and having a charge of paint or the like filling only a portion of the volume thereof thereby to accommodate admission of liquified gas into the container via the dip tube.

9. A sprayer for oil-based paint or the like for use with a bottle of propane having a neck and a check valve therein comprising, in combination, a vertically extending frame having a transverse cross member portion at the top and a threaded flange at the bottom joined by an elongated central handle portion of sharply reduced but relatively constant cross section, of such length as to accommodate a gripping hand, a tank in the form of a wide-mouthed cup threaded to the flange, a nozzle chamber in the cross member, a nozzle at one end of the cross member communicating with said chamber, a valve plunger extending longitudinally in the cross member and having means for biasing the same endwise in the direction of the nozzle, means including a trigger at the upper end of the handle portion having a length which is only a small fraction of the length of the handle portion for digital operation and coupled to the valve plunger for controllably unseating the plunger from the nozzle, an adjustable bottoming stop for determining the degree of unseating movement of the plunger, said handle portion having a passageway extending downwardly therein from the nozzle chamber into the tank, a dip tube communicating with the passageway and extending substantially to the bottom of the tank, said handle portion being generally centered with respect to the threaded flange so that the center of gravity of the tank and its contents is pendulously below the handle portion so that the sprayer tends to remain upright when the handle portion is gripped by the hand of the user.

10. A sprayer for spraying a liquid containing hydrocarbon for use with a bottle of propane having a neck and a check valve therein comprising, in combination, a frame having a nozzle and nozzle chamber, a spring biased plunger associated with the nozzle and having a trigger for manually unseating the same for controlling the flow, a tank, a dip tube means communicating with the nozzle chamber and extending substantially to the bottom of the tank, a nipple having one end dimensioned to fit into the neck of a bottle of propane for unseating the check valve in the latter and the other end dimensioned for seating over the nozzle so that when the bottle is temporarily pressed into position on the nipple liquefied propane flows through the nozzle chamber and dip tube means for mixing with the liquid in the tank.

References Cited

UNITED STATES PATENTS

| | | | |
|---|---|---|---|
| 1,305,964 | 6/1919 | Dickson | 137—557 X |
| 1,626,096 | 4/1927 | Riechenbach | 239—527 X |
| 2,072,629 | 3/1937 | Fernholz | 141—17 |
| 2,189,643 | 2/1940 | Ward | 141—17 |
| 3,135,431 | 6/1964 | Matthewson et al. | 222—183 |
| 3,343,718 | 9/1967 | Siegel et al. | 141—363 X |

HOUSTON S. BELL, Jr., Primary Examiner

U.S. Cl. X.R.

141—95, 363; 137—557; 222—183; 239—308, 526